United States Patent
Krivopaltsev et al.

(10) Patent No.: US 9,465,529 B1
(45) Date of Patent: *Oct. 11, 2016

(54) PLATFORM-INDEPENDENT ENVIRONMENTS FOR CUSTOMIZING USER INTERFACES OF NATIVE APPLICATIONS FOR PORTABLE ELECTRONIC DEVICES

(71) Applicant: INTUIT INC., Mountain View, CA (US)

(72) Inventors: Eugene Krivopaltsev, San Jose, CA (US); Desiree D. G. Gosby, San Francisco, CA (US); Peijun Chiang, San Jose, CA (US); Praveen R. Swadi, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 460 days.

This patent is subject to a terminal disclaimer.

(21) Appl. No.: 13/911,916

(22) Filed: Jun. 6, 2013

Related U.S. Application Data

(63) Continuation of application No. 13/796,329, filed on Mar. 12, 2013.

(51) Int. Cl.
*G06F 3/0481* (2013.01)
*G06F 3/0484* (2013.01)
*G06F 9/44* (2006.01)

(52) U.S. Cl.
CPC ......... *G06F 3/04842* (2013.01); *G06F 9/4443* (2013.01)

(58) Field of Classification Search
CPC ........ G06F 3/00; G06F 3/048; G06F 3/0481; G06F 9/44; G06F 9/4443; G06F 17/00; G06F 17/211; G06F 17/212; G06F 17/2247; G06F 17/30905; H04L 29/06
See application file for complete search history.

(56) References Cited

U.S. PATENT DOCUMENTS

| | | | | |
|---|---|---|---|---|
| 7,287,230 | B2 * | 10/2007 | Austin | G06F 3/0481 709/217 |
| 2003/0058277 | A1 * | 3/2003 | Bowman-Amuah | G06F 17/30607 715/765 |
| 2006/0259577 | A1 * | 11/2006 | Fritsch | H04L 41/5054 709/217 |
| 2012/0159308 | A1 * | 6/2012 | Tseng | G06F 9/4443 715/234 |
| 2014/0068421 | A1 * | 3/2014 | Bourke | G06F 8/38 715/235 |

* cited by examiner

*Primary Examiner* — Xiomar L Bautista
(74) *Attorney, Agent, or Firm* — Patterson & Sheridan, LLP

(57) ABSTRACT

The disclosed embodiments provide a system that provides a user interface of a native application for a portable electronic device. During operation, the system provides an environment for customizing the user interface using one or more custom views. The one or more custom views may include a set of user-interface components, a layout of the user-interface components, and a configuration of a user-interface component from the set of user-interface components. Next, the system enables use of the one or more custom views with the native application through the environment independently of a platform of the native application.

24 Claims, 7 Drawing Sheets

PLATFORM-INDEPENDENT ENVIRONMENTS FOR CUSTOMIZING USER INTERFACES OF NATIVE APPLICATIONS FOR PORTABLE ELECTRONIC DEVICES

RELATED APPLICATION

This application is a continuation-in-part of application Ser. No. 13/796,329, entitled "Customizing User Interfaces of Native Applications for Portable Electronic Devices," by inventors Eugene Krivopaltsev, Desiree D. G. Gosby and Cheryl Ainoa, filed 12 Mar. 2013.

BACKGROUND

Related Art

The disclosed embodiments relate to user interfaces for portable electronic devices. More specifically, the disclosed embodiments relate to platform-independent environments for customizing user interfaces of native applications for portable electronic devices.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

Usability is an important consideration in designing user interfaces. In particular, usability considerations may include: the efficiency with which tasks are accomplished through the UI; the user's ability to learn and master the operation of the UI; and/or the availability of feedback, help, documentation, and/or status information within the UI. For example, the user may accomplish tasks more easily and quickly if UI elements are arranged and displayed in a meaningful way within the UI. Consequently, user satisfaction with an application on an electronic device may be highly influenced by characteristics of the user interface provided by the application and/or the user's ability to interact with the user interface through I/O devices of the electronic device.

SUMMARY

The disclosed embodiments provide a system that provides a user interface of a native application for a portable electronic device. During operation, the system provides an environment for customizing the user interface using one or more custom views. The one or more custom views may include a set of user-interface components, a layout of the user-interface components, and a configuration of a user-interface component from the set of user-interface components. Next, the system enables use of the one or more custom views with the native application through the environment independently of a platform of the native application.

In some embodiments, the environment includes:
  (i) a configuration apparatus configured to enable creation of the one or more custom views by a user;
  (ii) a rendering apparatus configured to display the one or more custom views within the user interface; and
  (iii) a management apparatus configured to enable management of the one or more custom views.

In some embodiments, enabling creation of the one or more custom views involves:
  (i) displaying a list of user-interface components for the native application based on a component registry for the native application;
  (ii) obtaining a selection of the user-interface component from the list; and
  (iii) instantiating the user-interface component within the layout based on a component binding for a platform of the portable electronic device.

In some embodiments, enabling creation of the one or more custom views further involves obtaining the configuration of the user-interface component from at least one of the user and the component registry.

In some embodiments, enabling creation of the one or more custom views further involves saving the layout, the user-interface component, and the configuration in a platform-independent format.

In some embodiments, displaying the one or more custom views within the user interface involves instantiating the layout within the user interface, and configuring the layout based on one or more attributes associated with the layout.

In some embodiments, displaying the one or more custom views within the user interface further involves instantiating the user-interface component within the layout, and providing the configuration to the instantiated user-interface component.

In some embodiments, displaying the one or more custom views within the user interface further involves pairing the user-interface component and another user-interface component in the layout based on complementary uses of data by the user-interface component and the other user-interface component.

In some embodiments, management of the one or more custom views is associated with at least one of:
  (i) creation of a new custom view;
  (ii) modification of an existing custom view;
  (iii) deletion of the existing custom view; and
  (iv) filtering of the list.

In some embodiments, enabling use of the one or more custom views with the native application through the environment independently of the platform of the native application involves at least one of providing the one or more custom views to the portable electronic device from a remote storage system, and selecting the one or more custom views for use with the native application based on a use case of the native application.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
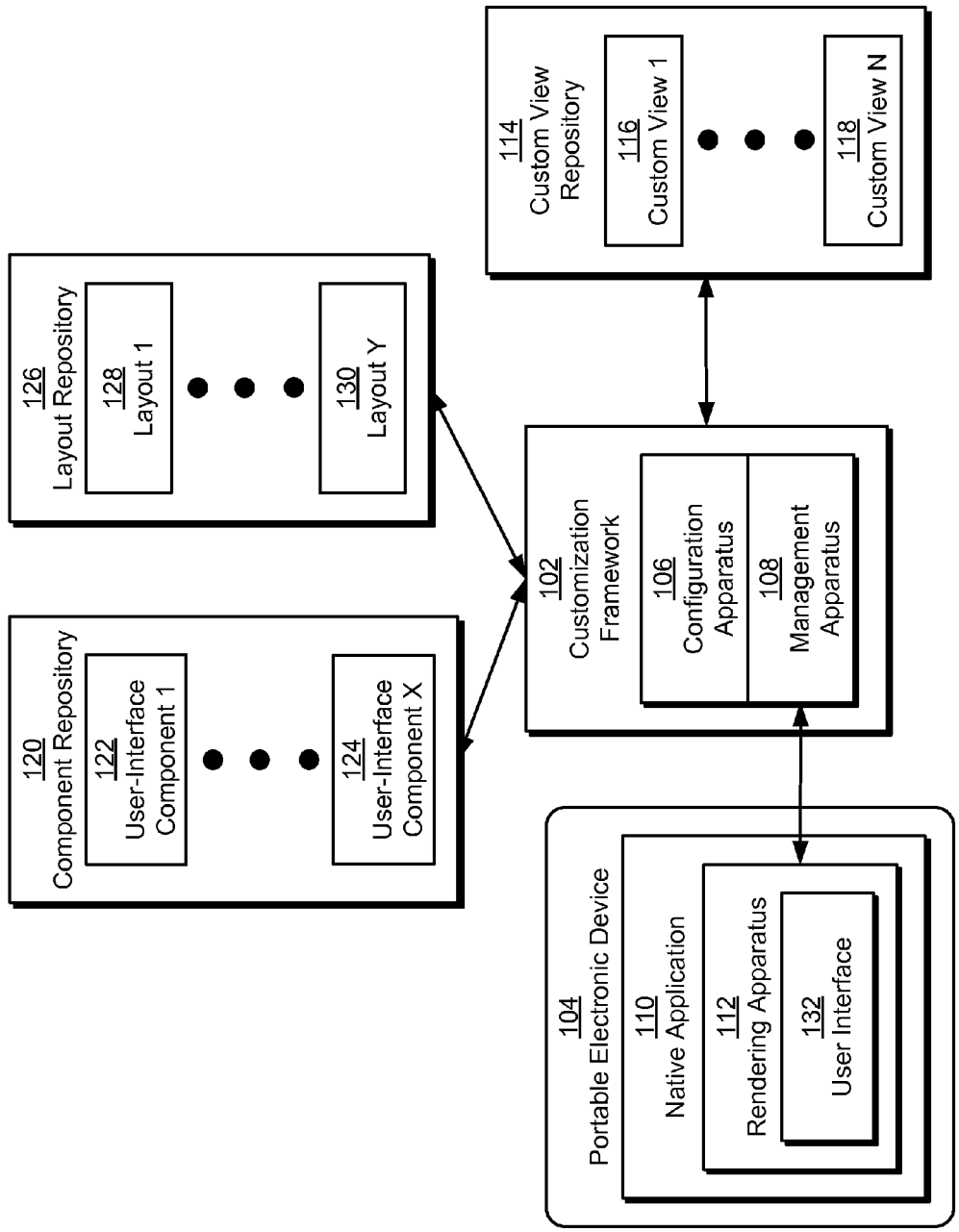
FIG. 1 shows a schematic of a system in accordance with the disclosed embodiments.

The disclosed embodiments provide a method and system for facilitating use of a native application for a portable electronic device. As shown in FIG. 1, a native application 110 may reside on a portable electronic device 104 such as a mobile phone, tablet computer, personal digital assistant, and/or portable media player. For example, native application 110 may be downloaded from an application distribution system and/or content provider and installed locally on portable electronic device 104. As a result, the implementation of native application 110 may be based on the platform (e.g., operating system, hardware, etc.) of portable electronic device 104.

Native application 110 may then be used to perform a set of tasks for a user of portable electronic device 104. For example, native application 110 may allow the user to browse websites, send and receive emails, access and/or organize digital media, play a game, use mapping and/or navigation services, and/or manage personal finances on portable electronic device 104.

During use of native application 110, portable electronic device 104 may use a network connection to obtain data associated with native application 110 from a server and transmit updates to the data to the server. For example, portable electronic device 104 may use a wireless and/or cellular network to send and receive emails, financial information, digital media, game play information, and/or other data used by native application 110 with the server. As a result, native application 110 may execute using a client-server model.

In addition, interaction between the user and native application 110 may be enabled by a user interface 132. For example, user interface 132 may be a graphical user interface (GUI) that displays text, images, documents, menus, icons, thumbnails, form fields, data, and/or other user-interface elements to the user. The GUI may also accept user input (e.g., gestures, keyboard presses, etc.) that is used to manipulate and/or update the elements. In other words, user interface 132 may be a mechanism for providing and/or formatting data and/or features associated with native application 110 for use on portable electronic device 104.

However, the arrangement of screens and/or user-interface elements within the screens in user interface 132 may be hard-coded into native application 110. For example, a developer of native application 110 may create user interface 132 by making method calls to an application-programming interface (API) associated with the platform of portable electronic device 104 within source code for native application 110. In turn, changes to user interface 132 may require the installation of a new version of native application 110 and/or an update to native application 110 on portable electronic device 104. The new version and/or update may additionally require approval by the application distribution system and/or content provider before the new version and/or update is released, thus delaying propagation of the changes to portable electronic device 104. In other words, changes and/or customizations to user interface 132 may lead to the proliferation of different versions of native application 110 and increase the complexity associated with managing and/or releasing native application 110.

The static nature of user interface 132 may also limit the user's ability to customize user interface 132 to his/her preferences. For example, the user may not be able to change the layout, content, and/or configuration of user-interface elements within a screen of user interface 132. As a result, the user may find interaction with native application 110 to be confusing, inefficient, and/or limited, which may negatively impact the user's experience with native application 110.

In one or more embodiments, the system of FIG. 1 includes functionality to enable customization of user interface 132 independently of the platform and/or implementation of native application 110. Such customization may be performed by the user of portable electronic device 104 and/or another user associated with native application 110. For example, the user of portable electronic device 104 may be a "power user" who customizes user interface 132 to tailor the order and/or arrangement of features and/or data within user interface 132 to the user's preferences and/or needs. Conversely, user interface 132 may be customized by a developer and/or administrator of native application 110 to provide different variations of user interface 132 for different use cases (e.g., types of users, types of native application 110, platform, type and/or form factor of portable electronic device 104, etc.) of native application 110.

In particular, a customization framework 102 for user interface 132 may provide an environment for enabling the creation of a set of custom views (e.g., custom view 1 116, custom view n 118) for user interface 132, as well as the subsequent use of the custom views with native application 110. Each custom view may represent a custom layout and/or configuration of data and/or features in native application 110 within a screen of user interface 132.

During creation of a custom view, a configuration apparatus 106 in customization framework 102 may obtain a set of layouts (e.g., layout 1 128, layout y 130) for the custom view from a layout repository 126 and a set of user-interface components (e.g., user-interface component 1 122, user-interface component x 124) for native application 110 from a component repository 120. The layouts may correspond to screen layouts for user interface 132, while the user-interface components may represent features of native application 110 that may be placed into predefined regions within the layouts.

Because native application 110 may be used with different types and/or sizes of portable electronic devices, configuration apparatus 106 may obtain layouts that are suitable for use with the type (e.g., form factor, dimensions, etc.) of portable electronic device 104. For example, configuration apparatus 106 may obtain layouts with fewer and/or smaller regions for use with a mobile phone and layouts with more and/or larger regions for use with a tablet computer. On the other hand, the user-interface components may provide functionality associated with native application 110. As a result, configuration apparatus 106 may obtain user-interface components that are defined for use with native application 110 and/or a specific use case of native application 110 by a developer of native application 110. For example, configuration apparatus 106 may obtain the user-interface components from a particular implementation and/or definition of native application 110.

Configuration apparatus 106 may also provide a set of tools for creating the custom view from the layouts and user-interface components. First, configuration apparatus 106 may provide the layouts to the user creating the custom view (e.g., the user of portable electronic device 104, a developer of native application 110, etc.) and obtain a selection of one of the layouts for use in the custom view. After the user selects a layout for use in the custom view, configuration apparatus 106 may enable placement of one or more of the user-interface components within the layout and/or reallocation of space within the layout to the placed user-interface components. For example, configuration apparatus 106 may allow the user to drag a user-interface component to each predefined region in the layout. Configuration apparatus 106 may also provide a "ruler" tool that allows the user to resize the regions in the layout so that the user-interface components in the regions occupy more or less of the available space in the custom view.

Once a user-interface component is placed into a predefined region in the layout, configuration apparatus 106 may instantiate the user-interface component and obtain a configuration of the user-interface component from the user. The configuration may include parameters that affect the behavior and/or appearance of the user-interface component. For example, the configuration may include a category, a range, (e.g., date range, value range, etc.), a tag (e.g., user-defined tag), a value, and/or a display setting (e.g., color, font, size, etc.) associated with display of data and/or user-interface elements (e.g., menus, buttons, checkboxes, etc.) within the user-interface component. If the user does not wish to configure the user-interface component, a set of default configuration parameters may be obtained from component repository 120 and/or another source and used to configure the user-interface component. The operation of configuration apparatus 106 is described in further detail below with respect to FIG. 2.

After the user is finished creating the custom view, configuration apparatus 106 may store the custom view in a custom view repository 114 for subsequent use with native application 110. The custom view may be stored in a platform-independent format to enable use of the custom view with native application 110 independently of a platform of portable electronic device 104.

In addition, custom view repository 114 may be located in a variety of locations to facilitate access to the custom view by one or more users of native application 110. For example, configuration apparatus 106 may store the custom view in a local custom view repository on portable electronic device 104 if the custom view is created by the user of portable electronic device 104. On the other hand, configuration apparatus 106 may store the custom view in a remote custom view repository (e.g., server, cloud storage, etc.) if the custom view is created by a developer of native application 110 to enable access to the custom view from multiple users of native application 110 across multiple portable electronic devices.

A management apparatus 108 in customization framework 102 may then enable use of the custom views with native application 110 independently of the platform (e.g., operating system) of native application 110. More specifically, management apparatus 108 may provide the custom views to a rendering apparatus 112 in native application 110 for display of the custom views within user interface 132. For example, management apparatus 108 may obtain a custom view from custom view repository 114 as structured data in a platform-independent format that specifies the layout of the custom view, user-interface components within the layout, configurations of the user-interface components, and/or the sizes of regions containing the user-interface components in the layout.

Management apparatus 108 may additionally enable management of the custom views. For example, management apparatus 108 and/or rendering apparatus 112 may display a list of the custom views and allow reordering and/or filtering of the list, so that the custom views may be accessed in a different order within user interface 132. Management apparatus 108 may also provide mechanisms for creating new custom views and/or deleting existing custom views.

Finally, rendering apparatus 112 may display the custom views within user interface 132. For example, rendering apparatus 112 may use the structured data to instantiate the layout of a custom view within user interface 132, assemble and instantiate user-interface components within the layout, and pass configurations of the user-interface components to the instantiated user-interface components and/or native application 110 for processing and update of the user-interface components. Rendering apparatus 112 may also pair user-interface components in the layout based on complementary uses of data by the user-interface components. The operation of rendering apparatus 112 is described in further detail below with respect to FIG. 3.

Consequently, customization framework 102 may allow changes to user interface 132 to be made and used with different portable electronic devices without modifying native application 110. In particular, the use of structured data in defining the custom views may decouple the platform-specific implementation of features by native application 110 from the arrangement and/or configuration of user-interface components associated with the features within user interface 132. In turn, the custom views may be used by the user of portable electronic device 104 to customize his/her experience with native application 110 and/or by a developer to tailor native application 110 to different types of users and/or use cases without implementing a new native application for each user, type of user, and/or use case.

Those skilled in the art will appreciate that the system of FIG. 1 may be implemented in a variety of ways. First, configuration apparatus 106, management apparatus 108, rendering apparatus 112, component repository 120, layout repository 126, and/or custom view repository 114 may be provided by a single physical machine, multiple computer systems, a grid, one or more databases, one or more file-systems, and/or a cloud computing system. In addition, configuration apparatus 106, management apparatus 108, and/or rendering apparatus 112 may be provided by the same hardware and/or software component, or configuration apparatus 106 and management apparatus 108 may execute independently from one another. For example, configuration apparatus 106 and management apparatus 108 may reside on portable electronic device 104 along with rendering apparatus 112, or configuration apparatus 106 and/or management apparatus 108 may execute on a server that is capable of communicating with portable electronic device 104 and providing custom views for native application 110 to portable electronic device 104.

Second, user-interface components, layouts, and/or custom views for native application 110 may be defined using a number of techniques. For example, customization framework 102 may obtain, store, and/or provide the layouts and/or custom views as property lists, Extensible Markup Language (XML) documents, JavaScript Object Notation (JSON) objects, and/or other types of structured, platform-agnostic data. Customization framework 102 may also obtain parameters associated with configurations for user-interface components from interfaces for the user-interface components and/or definitions of the user-interface components provided by developers of native application 110.

Figure 2:
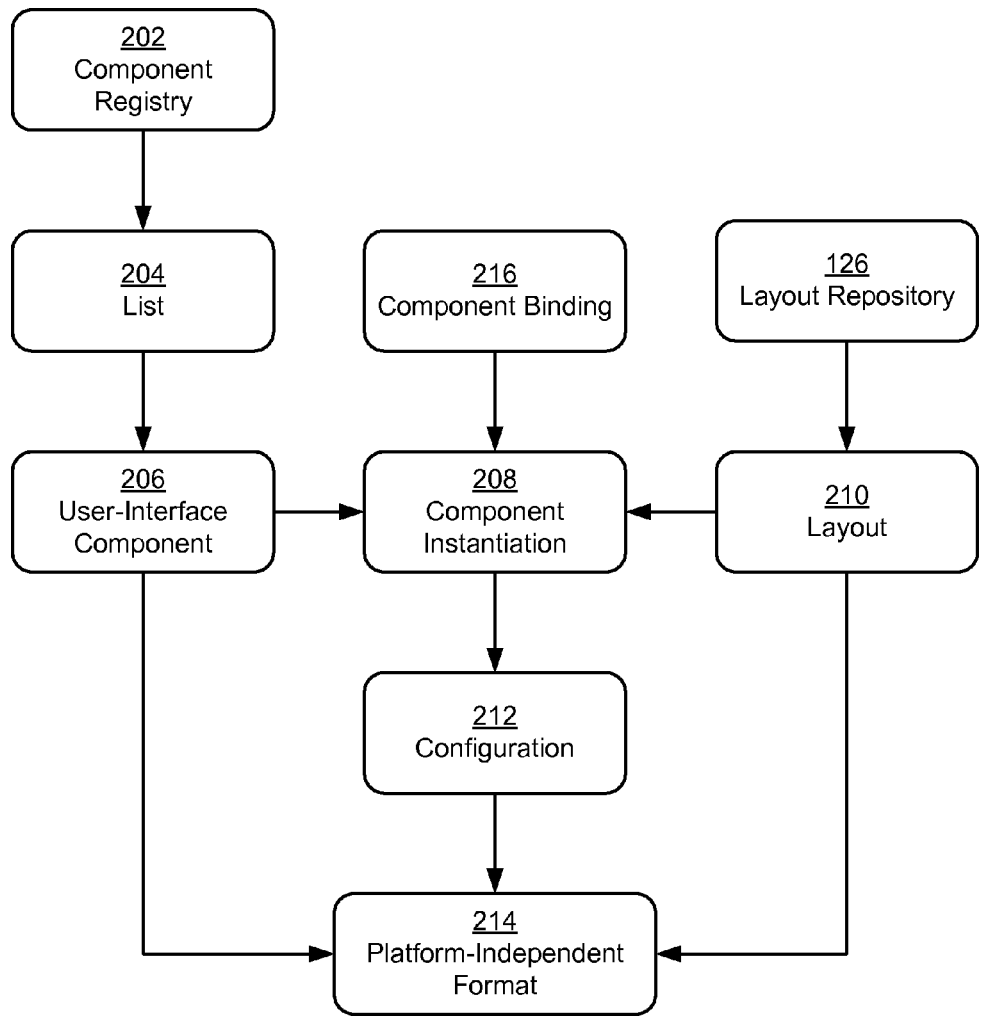
FIG. 2 shows the operation of a configuration apparatus in an environment for customizing a user interface of a native application for a portable electronic device in accordance with the disclosed embodiments.

FIG. 2 shows the operation of a configuration apparatus (e.g., configuration apparatus 106 of FIG. 1) in an environment for customizing a user interface of a native application for a portable electronic device in accordance with the disclosed embodiments. As mentioned above, the configuration apparatus may enable the creation of a custom view for the user interface by a user.

First, the configuration apparatus may display a list 204 of user-interface components for the native application to the user based on a component registry 202 for the native application. For example, the configuration apparatus may display list 204 within a user interface for creating the custom view. Component registry 202 may include metadata that describes available user-interface components for the native application, such as user-interface components in component repository 120 of FIG. 1.

Next, the configuration apparatus may obtain a selection of a user-interface component 206 from list 204, as well as a selection of a layout 210 from layout repository 126. Continuing with the above example, the configuration apparatus may display a set of icons representing possible layouts from layout repository 126 within the user interface for creating the custom view and allow the user to select an icon representing layout 210 from the set. The configuration apparatus may also allow the user to drag and drop user-interface component 206 from list 204 into a region of layout 210.

The configuration apparatus may then instantiate user-interface component 206 within the region of layout 210 based on a component binding 216 for a platform of the portable electronic device, resulting in a component instantiation 208 for user-interface component 206. Component binding 216 may provide a mapping of a platform-independent user-interface component 206 from component registry 202 to a platform-specific implementation of user-interface component 206. In other words, component binding 216 may allow the configuration apparatus to identify and/or locate a class and/or object implementing user-interface component 206 that can be used with the portable electronic device.

After component instantiation 208 is created, the configuration apparatus may obtain a configuration 212 of user-interface component 206 from the user and/or component registry 202. For example, the configuration apparatus may obtain an initial configuration of user-interface component 206 from metadata for user-interface component 206 in component registry 202. Moreover, the configuration apparatus may obtain a set of parameters for configuring the user-interface component from the user through the user interface for creating the custom view, in lieu of or in addition to the initial configuration from component registry 202.

Finally, the configuration apparatus may save user-interface component 206, configuration 212, and layout 210 in a platform-independent format 214 representing the custom view. For example, the configuration apparatus may store platform-independent format 214 as structured data in custom view repository 114 of FIG. 1. The configuration apparatus may also create a "derived component" containing configuration 212 of user-interface component 206 and save the derived component in component registry 202 and/or the component repository, thus enabling subsequent use of user-interface component 206 with configuration 212 without requiring the user and/or another user to manually customize user-interface component 206 with configuration 212.

For example, component registry 202 may describe a set of platform-independent user-interface components using the following metadata:
"components": [
  {
    "name": "Alerts and Advices",
    "tag": "mint_feed",
    "description": "This component shows current Mint alerts and advices. Not configurable",
    "hidden": false,
    "icon": "ic_alerts_advices",

```
"suggestedLayout": {
    "type": "proportional",
    "value": 1
  }
},
{
  "name": "Account Balances",
  "tag": "mint_accounts",
  "description": "This component shows your account
    balances details. Not configurable",
  "hidden": false,
  "icon": "ic_accounts",
  "suggestedLayout": {
    "type": "proportional",
    "value": 1
  }
},
{
  "name": "Spending View\nBy Icon",
  "tag": "mint_spending_icon",
  "icon": "ic_spending",
  "description": "This component shows the Spending
    View by Icon. By default, it displays expenses for all
    accounts for the current month. Configurable",
  "flexible": true,
  "hidden": false
},
{
  "name": "Spending\nBy Category",
  "tag": "mint_spending_category",
  "description": "This component shows the Spending
    View as a Pie Chart. By default, it displays expenses
    for all accounts for the last month. Configurable",
  "flexible": true,
  "hidden": false,
  "icon": "ic_pie_chart"
},
{
  "name": "Spending\n Over Time",
  "tag": "mint_spending_time",
  "description": "This component shows the Spending
    View as a Bar Chart. By default, it displays expenses
    for all accounts for the last month. Configurable",
  "flexible": true,
  "hidden": false,
  "icon": "ic_bar_chart"
},
{
  "name": "Web View",
  "tag": "webview",
  "description": "The component demonstrates a web
    view.",
  "configuration":
    "{\"url\":\"http://www.intuit.com\"}",
  "icon": "ic_webview",
  "hidden": false,
  "flexible": true,
  "suggestedLayout": {
    "type": "proportional",
    "value": 1
  }
}
]
```

Within the metadata, a number of user-interface components may be listed. Each user-interface component may include a "name," "description," and "icon" that are shown within list 204. The user-interface component may also include a unique "tag" that is used to link the user-interface component to an implementation of the user-interface component, as specified in component binding 216. Finally, one or more user-interface components may be "flexible," indicating that configurations (e.g., configuration 212) may be obtained for the user-interface components from the user. The "Web View" user-interface component may also include an initial "configuration" of a Uniform Resource Locator (URL) that provides an initial view of the user-interface component, which may be subsequently modified by the user through additional configuration of the user-interface component. Other user-interface components may also include initial configurations as specified by URLs, file paths, and/or other strings that describe and/or specify initial views of the user-interface components.

Similarly, component binding 216 may map the exemplary user-interface components to implementations of the user-interface components using the following metadata:

```
"tags": [
  {
    "type": "component",
    "tag": "mint_feed",
    "value": "com.mint.fragment.FeedFragment"
  },
  {
    "type": "component",
    "tag": "mint_spending_icon",
    "value": "com.mint.fragment.MinSpendingIconFragment"
  },
  {
    "type": "component",
    "tag": "mint_spending_category",
    "value": "com.mint.fragment.MinSpendingPieFragment"
  },
  {
    "type": "component",
    "tag": "mint_spending_time",
    "value": "com.mint.fragment.MinSpendingBarFragment"
  },
  {
    "type": "component",
    "tag": "mint_accounts",
    "value": "com.mint.fragment.balances. AccountBalancesFragment"
  },
  {
    "type": "component",
    "tag": "webview",
    "value": "com.intuit.mobilelib.vespa.component. webview.WebViewComponent"
  },
]
```

Within the metadata, a "tag" of each user-interface component is specified, along with a "value" representing a class and/or object implementing the user-interface component. The configuration apparatus may thus instantiate the user-interface component by searching for the user-interface component's "tag" in component binding 216 and locating the class and/or object represented by the user-interface component's "value."

Finally, platform-independent format 214 may include the following exemplary structured data:

```
{"modified":1358471559,"id":98,"appId":"mint","active":true,
```

```
"definition":"{
\"container\":{\"extentType\":\"proportional\",\"type\":
   \"vertical\"
\"children\":[{\"extentType\":\"proportional\",\"type\":
   \"carousel\",
\"children\":[{\"extentType\":\"filled\",\"flexible\":true,
\"configuration\":\"{\\\"title\\\":\\\"Spending By Cat-
   egory\\\"",
\\\"filter\\\":{\\\"categoriesincluded\\\":[2],\\\"endOfDat-
   eRangeExclusive\\\":\\\"Feb 01, 2013 12:00:00 AM\\\",
\\\"catName\\\":\\\"Shopping\\\",\\\"range\\\":4,
\\\"startOfDateRangeinclusive\\\":\\\"Jul 01, 2012 12:00:
   00 AM\\\"}}\",\"tag\":\"mint_spending_category\"},
{\"extentType\":\"filled\",\"flexible\":true,\"configura-
   tion\":\"{\ \"title\\\")"\\\"Net Income\\\",
\\\"filter\\\":{\\\"range\\\":4,\\\"startOfDateRangeInclu-
   sive\\\":\\\"Jul 01, 2012 12:00:00 AM\\\",
\\\"endOfDateRangeExclusive\\\":\\\"Feb 01, 2013 12:00:
   00 AM\\\"}}\", \"tag\":\"mint_net_income\"}]\"scrol-
   lable\":false,\"extentValue\":0.5),
{\"extentType\":\"proportional\",\"type\":\"horizontal\",
\"children\":[{\"extentType\":\"proportional\",\"type\":
   \"vertical\",
\"children\":[{\"extentType\":\"proportional\",\"flex-
   ible\":true,\"extentValue\":1,\"tag\":\"mint_feed\"}],
\"scrollable\":false,\"extentValue\":0.5},{\"extentType\":
   \"proportional\",\"type\":\"vertical\",
\"children\":[{\"extentType\":\"filled\",\"flexible\":true,
\"configuration\":\"{\\\"title\\\":\\\"Spending Over
   Time\\\",\\\"filter\\\":{\\\"range\\\":4,
\\\"startOfDateRangeInclusive\\\":\\\"Jul 01, 2012 12:00:
   00 AM\\\",
\\\"endOfDateRangeExclusive\\\":\\\"Feb 01, 2013 12:00:
   00 AM\\\"}}\",\"tag\":\"mint_spending_icon\"}],
\"scrollable\":false,\"extentValue\":0.5}],\"scrollable\":
   false,\"extentValue\": 05}],
\"scrollable\":false,\"extentValue\":0},\"name\":\"A
   Dashboard\"}","platform":"any","orientation":"any",
   "device":"any"}
```

Within the structured data, layout 210 may be described using a "container" and a set of "children" of the container. Three user-interface components and the associated configurations are also included within the layout; each user-interface component may be identified by "tag" and include a "configuration" of one or more parameters associated with the user-interface component. Because the structured data is text-based, creation of the custom view may not require rendering of layout 210 and/or user-interface component 206 within a user interface. Instead, the custom view may be manually created through a text editor and/or other mechanism for generating structured data by a user who is familiar with platform-independent format 214 and has access to component registry 202, component binding 216, and/or layout repository 126.

Figure 3:
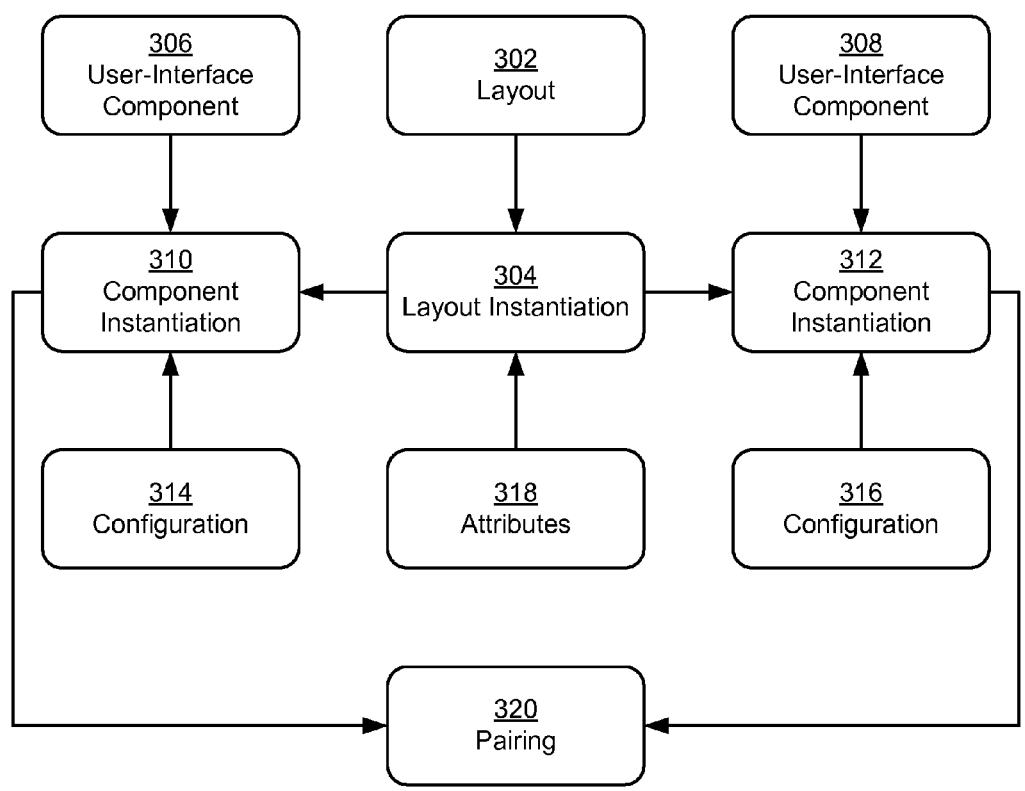
FIG. 3 shows the operation of a rendering apparatus in an environment for customizing a user interface of a native application for a portable electronic device in accordance with the disclosed embodiments.

FIG. 3 shows the operation of a rendering apparatus (e.g., rendering apparatus 112 of FIG. 1) in an environment for customizing a user interface of a native application for a portable electronic device in accordance with the disclosed embodiments. As described above, the rendering apparatus may display a custom view within the user interface, thereby enabling use of the custom view with the native application. As mentioned above, the custom view may be defined in a platform-independent format, such as platform-independent format 214 of FIG. 2.

First, the rendering apparatus may instantiate a layout 302 of the custom view, resulting in a layout instantiation 304. To instantiate layout 302, the rendering apparatus may create a set of regions within layout 302 and apply a set of attributes 318 to the regions. For example, the rendering apparatus may allocate space to the regions based on attributes 318 describing the dimensions and/or sizes of the regions within layout 302. The rendering apparatus may also apply special attributes 318, such as "scrolling" to enable scrolling within a region and/or "background" to set a background of the region. Because regions within layout 302 may be nested, creation of layout instantiation 304 may continue until all regions within layout 302 have been created and attributes 318 for each region have been applied to the region.

Next, the rendering apparatus may instantiate a set of user-interface components 306-308 within layout instantiation 304, resulting in a set of component instantiations 310-312. As with the configuration apparatus, the rendering apparatus may instantiate user-interface components 306-308 using a component binding for a platform of the electronic device. In addition, the rendering apparatus may place user-interface components 306-308 within regions of layout instantiation 304 according to layout "hints" for user-interface components 306-308 from the custom view. For example, the rendering apparatus may instantiate a user-interface component within an entire region of layout instantiation 304, a portion of the region, and/or a fixed set of dimensions within the region based on a parameter in the definition of the custom view that describes the placement of the user-interface component within the region.

The rendering apparatus may then provide a configuration 314-316 of each user-interface component 306-308 to the corresponding component instantiation 310-312. For example, the rendering apparatus may obtain configurations 314-316 from the definition of the custom view and pass configurations 314-316 to component instantiations 310-312 to allow component instantiations 310-312 to customize their behavior and/or appearance.

Finally, the rendering apparatus may generate a pairing 320 of component instantiations 310-312 and/or user-interface components 306-308 based on complementary uses of data by user-interface components 306-308. For example, user-interface components 306-308 may expose interfaces that describe and/or identify data produced and/or consumed by user-interface components 306-308. If the rendering apparatus determines that a first user-interface component produces a piece of data and a second user-interface component consumes the same piece of data (e.g., based on analysis of the user-interface components' interfaces), the rendering apparatus may set pairing 320 so that the data produced by the first user-interface component is passed to the second user-interface component for use by the second user-interface component.

Figure 4:
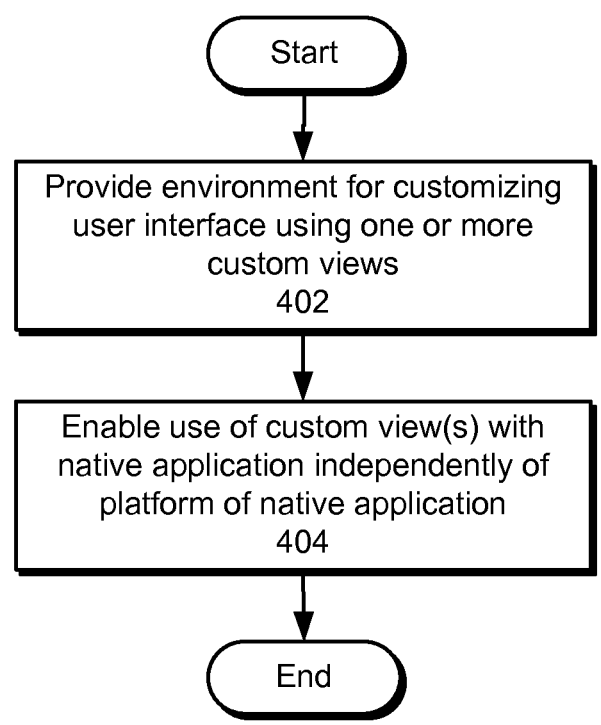
FIG. 4 shows a flowchart illustrating the process of providing a user interface of a native application for a portable electronic device in accordance with the disclosed embodiments.

FIG. 4 shows a flowchart illustrating the process of providing a user interface of a native application for a portable electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, an environment for customizing a user interface using one or more custom views is provided (operation 402). The custom view(s) may include a set of user-interface components, a layout of the user-interface components, and/or a configuration of a user-interface component from the set of user-interface components. The environment may include a configuration apparatus that enables creation of the custom view(s) by a user, as discussed in further detail below with respect to FIG. 5. The environment may also include a rendering apparatus that displays the custom view(s) within the user interface, as described in further detail below with respect to FIG. 6. Finally, the environment may include a management apparatus that enables management of the custom view(s). For example, the management apparatus may enable the creation of a new custom view, modification of an existing custom view, deletion of the existing custom view, and/or filtering of a list of the custom view(s).

Next, use of the custom view(s) with the native application is enabled independently of the platform of the native application (operation 404). In particular, the custom view(s) may be provided to the portable electronic device from a remote storage system, thus allowing access to the custom view(s) from multiple portable electronic devices on which the native application is installed. A copy of the custom view(s) may also be stored locally on the portable electronic device to enable use of the custom view(s) in the absence of a network connection between the portable electronic device and remote storage system. On the other hand, newer versions of the custom view(s), if available, may be obtained from the remote storage system if the network connection is available.

The custom view(s) may additionally be selected for use with the native application based on a use case of the native application. For example, the custom view(s) may be filtered before transmission from the remote storage system so that only the custom views associated with a certain tag, category, feature, "flavor" (e.g., basic, deluxe, premium, etc.), and/or type of the native application are used with the portable electronic device.

Figure 5:
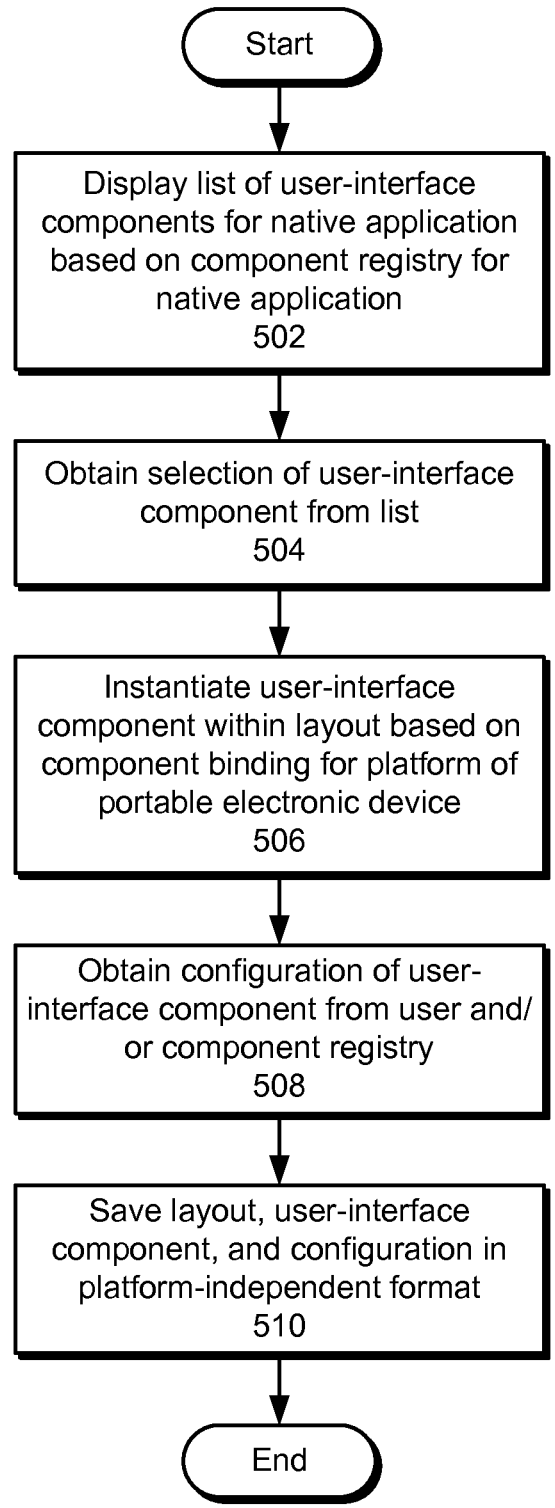
FIG. 5 shows a flowchart illustrating the process of enabling the creation of one or more custom views of a user interface in accordance with the disclosed embodiments.

FIG. 5 shows a flowchart illustrating the process of enabling the creation of one or more custom views of a user interface in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a list of user-interface components for the native application is displayed based on a component registry for the native application (operation 502). The component registry may contain metadata for available user-interface components of the native application. For example, the component registry may specify names, descriptions, icons, initial configurations, suggested placements, and/or configurabilities of the user-interface components. Next, a selection of a user-interface component is obtained from the list (operation 504). For example, a user may select the user-interface component by tapping a portion of the list corresponding to the user-interface component and/or dragging an icon representing the user-interface component to a region of a layout of the user interface.

After the user-interface component is selected, the user-interface component is instantiated within the layout based on a component binding for a platform of the portable electronic device (operation 506). The component binding may map platform-independent user-interface components for the native application to platform-specific implementations of the user-interface components. For example, the component binding may contain a "tag" that uniquely identifies a user-interface component and a "value" that identifies a class and/or object implementing the user-interface component.

A configuration of the user-interface component is also obtained from the user and/or the component registry (operation 508). For example, the component registry may provide an initial configuration of one or more parameters of the user-interface component, which may be used to customize the instantiated user-interface component. The user may also specify a title, category, range, tag, value, display setting, and/or another parameter associated with the user-interface component to change the appearance and/or behavior of the user-interface component, in lieu of or in addition to any initial configuration provided by the component registry.

Finally, the layout, user-interface component, and configuration are saved in a platform-independent format (operation 510) representing the custom view. For example, the layout, user-interface component, and configuration may be defined using structured data. The structured data may then be stored in a custom view repository (e.g., custom view repository 114 of FIG. 1) for subsequent retrieval and use with portable electronic devices independently of the portable electronic devices' platforms.

Figure 6:
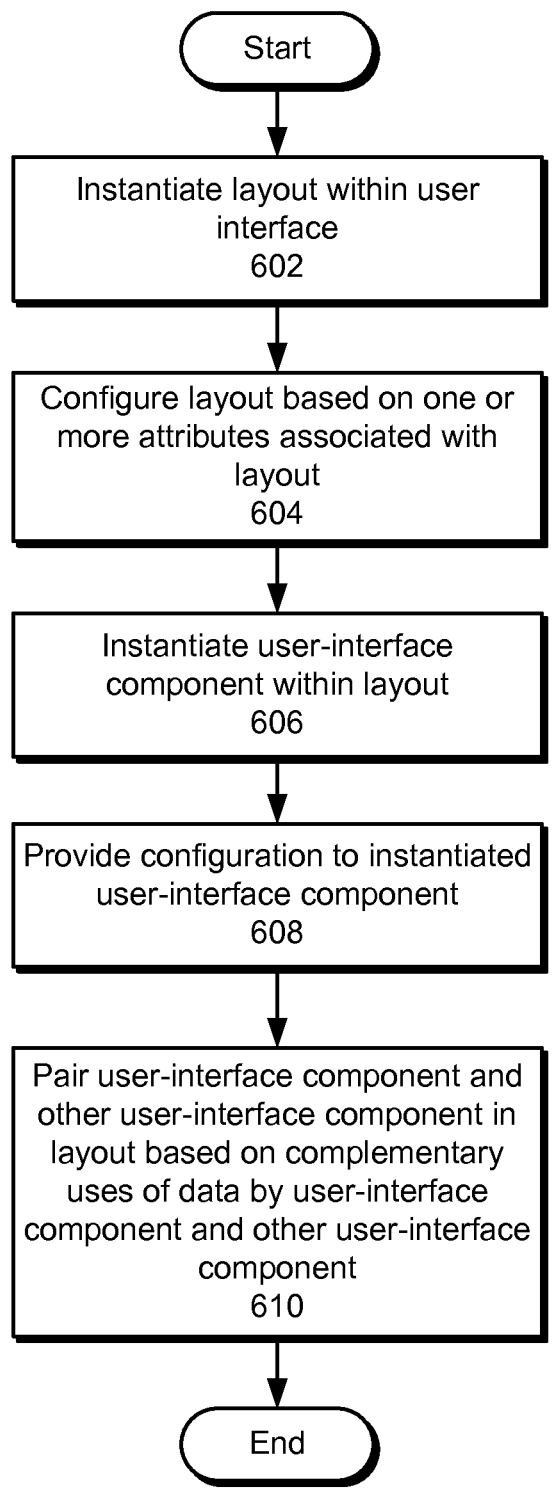
FIG. 6 shows a flowchart illustrating the process of displaying one or more custom views within a user interface in accordance with the disclosed embodiments.

FIG. 6 shows a flowchart illustrating the process of displaying a custom view within a user interface in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a layout is instantiated within the user interface (operation 602) and configured based on one or more attributes associated with the layout (operation 604). For example, a set of regions may be created within the layout, and the sizes, backgrounds, and/or other characteristics of the regions may be set based on the attributes. Next, a user-interface component is instantiated within the layout (operation 606), and a configuration is provided to the instantiated user-interface component (operation 608). As described above, the user-interface component may be instantiated using a platform-specific component binding. In addition, the configuration may be saved within the custom view and passed to the user-interface component to enable modification of the user-interface component's behavior and/or appearance based on the configuration.

Finally, the user-interface component and another user-interface component in the layout may be paired based on complementary uses of data by the user-interface component and the other user-interface component (operation 610). For example, interfaces exposed by the user-interface components may be analyzed to identify a first user-interface component as a producer of a piece of data and a second user-interface component as a consumer of the same piece of data. A relationship may then be set between the user-interface components so that the piece of data produced by the first user-interface component is passed to the second user-interface component for use by the second user-interface component.

Figure 7:
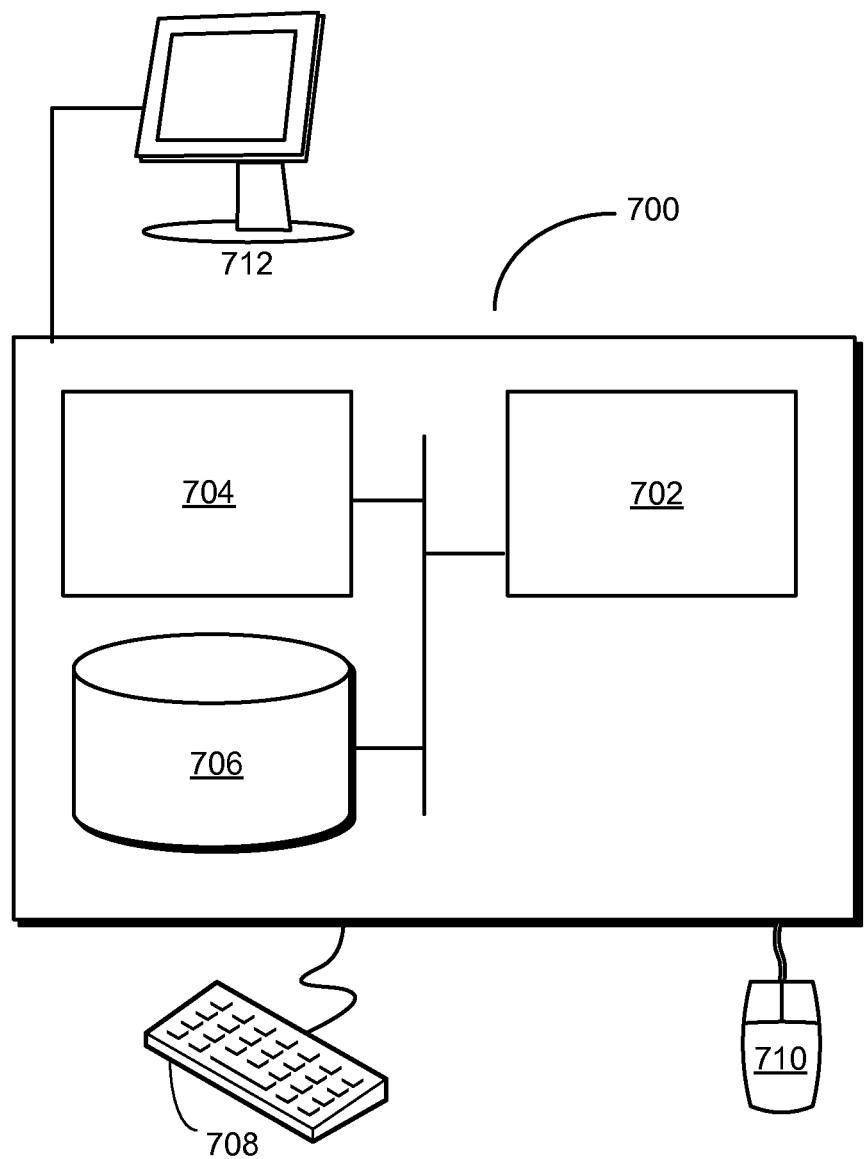
FIG. 7 shows a computer system in accordance with the disclosed embodiments.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for providing a user interface of a native application for a portable electronic device. The system may provide an environment for customizing the user interface using one or more custom views. The one or more custom views may include a set of user-interface components, a layout of the user-interface components, and a configuration of a user-interface component from the set of user-interface components. The system may also enable use of the one or more custom views with the native application through the environment independently of a platform of the native application.

Within the environment, a configuration apparatus may enable creation of the one or more custom views by a user. In addition, a rendering apparatus may display the one or more custom views within the user interface. Finally, a management apparatus may enable management of the one or more custom views.

In addition, one or more components of computer system 700 may be remotely located and connected to the other components over a network. Portions of the present embodiments (e.g., configuration apparatus, rendering apparatus, management apparatus, etc.) may also be located on different nodes of a distributed system that implements the embodiments. For example, the present embodiments may be implemented using a cloud computing system that provides custom views of the native application to a set of remote portable electronic devices on which the native application is installed.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for providing a user interface of a native application for a portable electronic device, comprising:
    providing an environment for customizing the user interface using one or more custom views, wherein the one or more custom views comprise a set of user-interface components, a layout of the user-interface components, and a configuration of a user-interface component from the set of user-interface components; and
    enabling, via a rendering apparatus within the native application, use of the one or more custom views with the native application through the environment independently of a platform of the native application.

2. The computer-implemented method of claim 1, wherein the environment comprises:
    a configuration apparatus configured to enable creation of the one or more custom views by a user;
    a rendering apparatus configured to display the one or more custom views within the user interface; and
    a management apparatus configured to enable management of the one or more custom views.

3. The computer-implemented method of claim 2, wherein enabling creation of the one or more custom views involves:
    displaying a list of user-interface components for the native application based on a component registry for the native application;
    obtaining a selection of the user-interface component from the list; and
    instantiating the user-interface component within the layout based on a component binding for a platform of the portable electronic device.

4. The computer-implemented method of claim 3, wherein enabling creation of the one or more custom views further involves:
    obtaining the configuration of the user-interface component from at least one of the user and the component registry.

5. The computer-implemented method of claim 4, wherein enabling creation of the one or more custom views further involves:
    saving the layout, the user-interface component, and the configuration in a platform-independent format.

6. The computer-implemented method of claim 2, wherein displaying the one or more custom views within the user interface involves:
    instantiating the layout within the user interface; and
    configuring the layout based on one or more attributes associated with the layout.

7. The computer-implemented method of claim 6, wherein displaying the one or more custom views within the user interface further involves:
    instantiating the user-interface component within the layout; and
    providing the configuration to the instantiated user-interface component.

8. The computer-implemented method of claim 7, wherein displaying the one or more custom views within the user interface further involves:
    pairing the user-interface component and another user-interface component in the layout based on complementary uses of data by the user-interface component and the other user-interface component.

9. The computer-implemented method of claim 2, wherein management of the one or more custom views is associated with at least one of:
    creation of a new custom view;
    modification of an existing custom view;
    deletion of the existing custom view; and
    filtering of a list of the one or more custom views.

10. The computer-implemented method of claim 1, wherein enabling use of the one or more custom views with the native application through the environment independently of the platform of the native application involves at least one of:
    providing the one or more custom views to the portable electronic device from a remote storage system; and
    selecting the one or more custom views for use with the native application based on a use case of the native application.

11. A system for providing a user interface of a native application for a portable electronic device, comprising:
    a configuration apparatus;
    a rendering apparatus; and
    a management apparatus,
    wherein the configuration apparatus, the rendering apparatus, and the management apparatus are configured to:

provide an environment for customizing the user interface using one or more custom views, wherein the one or more custom views comprise a set of user-interface components, a layout of the user-interface components, and a configuration of a user-interface component from the set of user-interface components; and enable, via the rendering apparatus within the native application, use of the one or more custom views with the native application through the environment independently of a platform of the native application.

12. The system of claim 11,
wherein the configuration apparatus is configured to enable creation of the one or more custom views by a user,
wherein the rendering apparatus is configured to display the one or more custom views within the user interface, and
wherein the management apparatus is configured to enable management of the one or more custom views.

13. The system of claim 12, wherein enabling creation of the one or more custom views involves:
   displaying a list of user-interface components for the native application based on a component registry for the native application;
   obtaining a selection of the user-interface component from the list;
   instantiating the user-interface component within the layout based on a component binding for a platform of the portable electronic device; and
   obtaining the configuration of the user-interface component from at least one of the user and the component registry.

14. The system of claim 12, wherein displaying the one or more custom views within the user interface involves:
   instantiating the layout within the user interface;
   configuring the layout based on one or more attributes associated with the layout;
   instantiating the user-interface component within the layout; and
   providing the configuration to the instantiated user-interface component.

15. The system of claim 14, wherein displaying the one or more custom views within the user interface further involves:
   pairing the user-interface component and another user-interface component in the layout based on complementary uses of data by the user-interface component and the other user-interface component.

16. The system of claim 12, wherein management of the one or more custom views is associated with at least one of:
   creation of a new custom view;
   modification of an existing custom view;
   deletion of the existing custom view; and
   filtering of a list of the one or more custom views.

17. The system of claim 11, wherein enabling use of the one or more custom views with the native application through the environment independently of the platform of the native application involves at least one of:
   providing the one or more custom views to the portable electronic device from a remote storage system; and
   selecting the one or more custom views for use with the native application based on a use case of the native application.

18. A computer-readable storage medium storing instructions that when executed by a computer cause the computer to perform a method for providing a user interface of a native application for a portable electronic device, the method comprising:
   providing an environment for customizing the user interface using one or more custom views, wherein the one or more custom views comprise a set of user-interface components, a layout of the user-interface components, and a configuration of a user-interface component from the set of user-interface components; and
   enabling, via a rendering apparatus within the native application, use of the one or more custom views with the native application through the environment independently of a platform of the native application.

19. The computer-readable storage medium of claim 18, wherein the environment comprises:
   a configuration apparatus configured to enable creation of the one or more custom views by a user;
   a rendering apparatus configured to display the one or more custom views within the user interface; and
   a management apparatus configured to enable management of the one or more custom views.

20. The computer-readable storage medium of claim 19, wherein enabling creation of the one or more custom views involves:
   displaying a list of user-interface components for the native application based on a component registry for the native application;
   obtaining a selection of the user-interface component from the list;
   instantiating the user-interface component within the layout based on a component binding for a platform of the portable electronic device; and
   obtaining the configuration of the user-interface component from at least one of the user and the component registry.

21. The computer-readable storage medium of claim 19, wherein displaying the one or more custom views within the user interface involves:
   instantiating the layout within the user interface;
   configuring the layout based on one or more attributes associated with the layout;
   instantiating the user-interface component within the layout; and
   providing the configuration to the instantiated user-interface component.

22. The computer-readable storage medium of claim 21, wherein displaying the one or more custom views within the user interface further involves:
   pairing the user-interface component and another user-interface component in the layout based on complementary uses of data by the user-interface component and the other user-interface component.

23. The computer-readable storage medium of claim 19, wherein management of the one or more custom views is associated with at least one of:
   creation of a new custom view;
   modification of an existing custom view;
   deletion of the existing custom view; and
   filtering of a list of the one or more custom views.

24. The computer-readable storage medium of claim 18, wherein enabling use of the one or more custom views with the native application through the environment independently of the platform of the native application involves at least one of:
   providing the one or more custom views to the portable electronic device from a remote storage system; and selecting the one or more custom views for use with the native application based on a use case of the native application.

* * * * *

UNITED STATES PATENT AND TRADEMARK OFFICE
CERTIFICATE OF CORRECTION

| | |
|---|---|
| PATENT NO. | : 9,465,529 B1 |
| APPLICATION NO. | : 13/911916 |
| DATED | : October 11, 2016 |
| INVENTOR(S) | : Krivopaltsev |

It is certified that error appears in the above-identified patent and that said Letters Patent is hereby corrected as shown below:

In the Claims

Column 15, Line 64, Claim 2, delete "a" and insert -- the --, therefor.

Column 18, Line 19, Claim 12, delete "a" and insert -- the --, therefor.

Signed and Sealed this
Twenty-fifth Day of April, 2017

Michelle K. Lee
*Director of the United States Patent and Trademark Office*